United States Patent [19]

Soubeyrat

[11] Patent Number: 5,215,003
[45] Date of Patent: Jun. 1, 1993

[54] SUPPORT FOR CHEESE MANUFACTURE

[76] Inventor: Michel Soubeyrat, Résidence Les Grives, Bâtiment D - Allée 2, F-38300 Bourgoin-Jallieu, France

[21] Appl. No.: 902,496

[22] Filed: Jun. 23, 1992

Related U.S. Application Data

[63] Continuation of Ser. No. 762,173, Sep. 20, 1991, abandoned, which is a continuation of Ser. No. 439,397, Nov. 16, 1989, filed as PCT/FR89/00118, Mar. 17, 1989, abandoned.

[30] Foreign Application Priority Data

Mar. 17, 1988 [FR] France .................. 88 03762

[51] Int. Cl.$^5$ .................. A23C 19/00; A01J 25/00; A01J 25/16; A01J 27/00
[52] U.S. Cl. .................. 99/458; 99/450; 99/452; 99/456; 428/76; 428/172; 428/247; 428/256
[58] Field of Search .................. 99/452, 456–459, 99/495, 496; 426/582, 36; 210/477, 506–508; 428/76, 172, 112, 192, 252, 113, 247, 251, 134, 142, 542.6, 255, 256

[56] References Cited

U.S. PATENT DOCUMENTS

| | | | |
|---|---|---|---|
| 1,418,242 | 5/1922 | Fieldman | 99/458 |
| 1,546,756 | 7/1925 | Schulze et al. | 99/458 |
| 2,185,586 | 1/1940 | Brooks | 210/500.27 |
| 2,480,778 | 8/1949 | Scharzkopf | 99/452 |
| 2,942,983 | 6/1960 | Sadler et al. | 99/452 |
| 3,562,909 | 2/1971 | Nikolic | 99/456 |
| 3,755,054 | 8/1973 | Medney | |
| 4,072,793 | 2/1978 | Watanabe et al. | 210/507 |
| 4,144,169 | 3/1979 | Grueschow | 210/501 |
| 4,157,680 | 6/1979 | Charles | 99/454 |
| 4,300,445 | 11/1981 | Hazen | 99/458 |
| 4,509,413 | 4/1985 | Granberg et al. | 99/453 |

FOREIGN PATENT DOCUMENTS

| | | |
|---|---|---|
| 261681 | 3/1988 | European Pat. Off. . |
| 1952252 | 10/1965 | Fed. Rep. of Germany . |
| 1956109 | 2/1967 | Fed. Rep. of Germany . |
| 1233221 | 10/1960 | France . |
| 1310890 | 10/1962 | France .................. 99/458 |
| 1536268 | 8/1968 | France . |
| 2411259 | 7/1979 | France . |
| 13833 | 4/1925 | Netherlands .................. 99/458 |

Primary Examiner—Timothy F. Simone
Attorney, Agent, or Firm—Armstrong, Nikaido, Marmelstein, Kubovcik & Murray

[57] ABSTRACT

A support for manufacturing and storage of cheese, including a mesh which is weared and stretched, and then secured on a peripheral, rigid reinforcement. The mesh has weft threads and warp threads which are interlaced, forming crossing zones. A coating of anti-corrosion synthetic material is provided, which coats threads of the mesh and the peripheral reinforcement, thereby forming an organic matrix connecting the weft threads and the warp threads of the mesh. The coating also provides a sealed surface along the threads of the mesh, along the peripheral reinforcement, in the crossing zones of the threads of the mesh, and in a connecting zone of the threads of the mesh to the peripheral reinforcement.

16 Claims, 2 Drawing Sheets

SUPPORT FOR CHEESE MANUFACTURE

This application is a continuation of application Ser. No. 07/762,173 filed Sep. 20, 1990, now abandoned, which is a continuation of application Ser. No. 439,397 filed Nov. 16, 1989, filed as PCT/FR89/00118, Mar. 17, 1989, now abandoned.

BACKGROUND OF THE INVENTION

The present invention relates to an improved support, of preferably composite materials, for the acidification, brining, maturing and storage of cheeses.

During the production of cheeses, the curds are subjected to a series of operations causing a reduction in the water content thereof.

The highly corrosive whey exudes raw material and must be removed quickly, since stagnation thereof around the cheese promotes the germination of harmful fungal flora.

The explanations and remarks which follow apply more particularly to cooked cheeses.

During the acidification stage, the cheese, surrounded by a belt, is deposited on a wooden support, generally round in shape. The wood does not promote draining and tends to trap the whey under the cheese, causing the abovementioned drawbacks and tending to remove the relief of the rind coming from the molding. This is partially overcome by turning over the cheese several times, which is a time consuming and expensive operation.

After acidification, the cheese, generally resting on the same support inserted in a pallet, is plunged into the brine in which it floats flattening itself under the upper support. This contact prevents the free circulation of the brine and causes a lack of homogeneity of salting which is offset by increasing the duration of brining.

After brining, the cheese passes into a maturing stage. It is then transferred onto a support, usually made of wood and circular in shape.

During maturing, some of the water remaining in the cheese evaporates. This causes the surface of the cheese to dry, which provides the hardness and strength of the rind.

The wooden support has the disadvantage of preventing the evaporation of water from the lower surface of the cheese where the moisture is concentrated, making the rind soft and adhesive and promoting the growth of molds and the development of bacteria. It is then necessary to turn over the cheese so that the moist surface is on top. Hence, an Emmental is turned over and brushed in order to remove molds some ten times during its maturing. These expensive operations are also laborious when they are carried out manually, an Emmental cheese weighing between seventy and eighty kilograms.

DESCRIPTION OF THE RELATED ART

In order to overcome these drawbacks, expensive perforated stainless steel sheet supports are sometimes used. The perforations thereof tend to become blocked as a result of removal of fat extracted by the sharp perforation edges, when the cheeses are pushed on the surface of the support. Furthermore, the supports, produced from thin sheet for economic reasons, tend to deform under the weight of large cheeses.

Other plasticized and perforated steel sheet supports are also used. Their working life is short because of their lack of resistance to corrosion, a phenomenon which is amplified if they are used in brine.

With this type of metal support, the proportion of the lower surface of the cheese exposed to the ambient air is approximately 40%.

With the aim of increasing this proportion, coverlets with forced air circulation, forming a type of air cushion have been constructed, but the complexity and cost of the system have limited the development thereof.

At the end of maturing, the cheese is usually transferred onto a wooden support inserted in a storage pallet also called a "cold-storage pallet". The cheese must be turned over once again here.

SUMMARY OF THE INVENTION

The support according to the invention makes it possible to overcome the various abovementioned disadvantages.

During the acidification stage, it ensures the flow of whey from the lower surface of the cheese, preventing the subsequent development of molds and parasitic microorganisms. It also prints on the surface a relief pattern promoting the strength and enhancing the appearance of the rind of the cheese. It then permits the free circulation of the brine over the upper surface of the cheese, guaranteeing good homogeneity of salting. Finally, it ensures optimum ventilation of the lower surface of the cheese during maturing and storage, preventing any risk of bacteriological contamination or any formation of molds, therefore making brushing during turning unnecessary.

It is also characterized by excellent resistance to corrosion, mechanical shocks and deformations due to the weight of the cheese.

In order to achieve at least some of the above objectives, the support according to the present invention comprises a mesh secured on a peripheral reinforcement and a coating of a synthetic material coating or impregnating the threads of the mesh so as to form an organic matrix and covering at least part of the reinforcement in order to remove interstices.

The coating of the support according to the invention is preferably made of a thermosetting resin, in particular of the vinyl ester type, of a thermoplastic resin, in particular of polypropylene, or of elastomer, in particular of polyurethane or silicone.

Preferably, the mesh of the support according to the invention comprises weft threads and warp threads, the one type being in a straight line and stretched in such a manner that the others which wind around them form projections.

In an advantageous variant, the mesh is composed of flat weft and/or warp threads.

According to the invention, the threads forming the mesh may advantageously be fibers of high mechanical strength, in particular glass, carbon, boron or aramid fibers, or synthetic fibers in particular of polyester or polyamide, or metal wires.

The peripheral reinforcement of the support of the invention may advantageously comprise an external casing of a shock- and friction-resistant material, it being possible for the casing to be composed of a felt, in particular of polyester fibers, impregnated with the synthetic material forming said coating.

In a variant embodiment, the reinforcement comprises a preferably metal ring and fibers impregnated with said synthetic material which wind around the metal ring and in which the peripheral edge of the mesh is embedded.

The reinforcement of the support for cheeses according to the invention may have any shape whatsoever. In an advantageous variant, the external shape of the cross-section of the reinforcement is symmetrical in relation to the plane of the mesh and has opposite surfaces inclined towards the mesh so as to form a V, parallel surfaces extending the branches of said V outwards and a peripheral wall joining said two parallel surfaces.

In a variant, the reinforcement comprises another part which protrudes in relation to the mesh, in which part securing apertures are provided.

According to the invention, the support may comprise a plate supported by the peripheral reinforcement and located at a distance from the mesh, with the plate being inclined and the reinforcement having at least one outlet aperture communicating with the space separating the plate and the mesh.

In yet another variant, the support comprises two meshes secured on the reinforcement, with the meshes being arranged in parallel and at a distance from one another, and a separating partition, the peripheral edge of which is integral with the reinforcement, the partition being inclined in relation to the meshes and the reinforcement having outlet apertures communicating with the two spaces separated by the separating partition.

According to the invention, the mesh may be, at least on one side, covered with a filter, the edges of which are inserted in the reinforcement. Said filter is advantageously made of polyolefin, in particular polypropylene.

BRIEF DESCRIPTION OF THE DRAWINGS

The present invention will be better understood from a study of various supports for cheeses described on a non-limiting basis and illustrated with the drawing in which.

DESCRIPTION OF THE PREFERRED EMBODIMENTS

Figure 1:
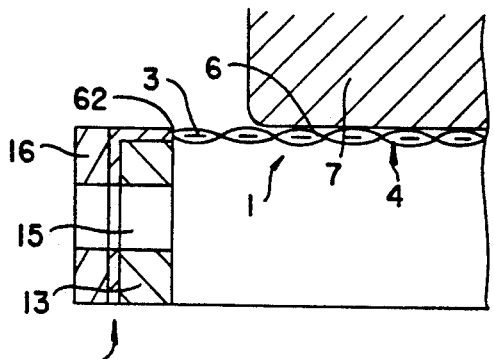
FIG. 1 shows a sectional view of a support for cheeses.
Figure 2:
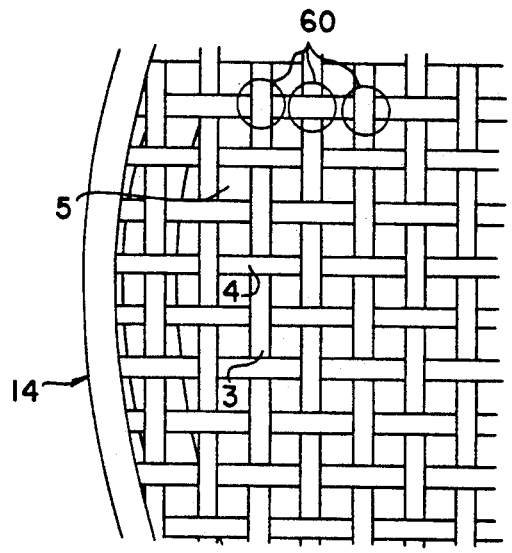
FIG. 2 shows a plan view of the support for cheeses of FIG. 1.

The support for cheese shown in FIGS. 1 and 2 comprises a network of crisscrossed twisted multifibers with a high modulus of elasticity embedded in an anti-corrosion synthetic resin matrix, forming a highly stretched, non-deformable mesh 1, forming one piece with a rigid reinforcement 2 by means of a matrix of the same nature.

The mesh is constructed with a weaving loom, in the manner of a fabric of which the warp threads 3, that is to say the plane assembly of the threads parallel in the direction of the length of the fabric, and the weft threads 4, that is to say the threads arranged in the direction of the width of the fabric, would be spaced so as to provide gaps 5 between them.

The warp threads 3 and the weft threads 4 are fitted together according to a crisscross pattern known as weave. Preferably, linen or plain weave, where the warp threads and the weft threads are interlaced alternately, is used. Each crisscross point can also be called a crossing zone, shown as item 60 in FIG. 2. However, other unidirectional weaves such as twill or satin may be used.

In a first embodiment intended for the acidification and brining, the mesh is composed of warp threads 3 and weft threads 4 which are identical and are made of twisted multifibers.

The monofilaments may be made of synthetic material: polyester, polyamide or polyolefin or of metal and the multifibers of the same materials as the monofilaments or of glass, carbon, boron, aramid or other materials having these properties.

The diameter and spacing of the warp threads 3 and the weft threads 4 is chosen in such a manner that reproduction of the relief thereof on the supported surface of the cheese, which is still soft at this stage of production, is similar to the relief imprinted by a traditional linen cloth. The latter, interposed, in the traditional technique, between the cheese and the wooden support, serves to drain the whey. Furthermore, it prints on the cheese crosswise striations formed by the warp and the weft contributing towards increasing the surface of the rind and consequently its strength. This technique is virtually no longer used because of its cost.

Use of warp threads 3 and weft threads 4 of a diameter of 0.6 mm, also distributed in the warp direction and weft direction according to a density of five threads per centimeter, makes it possible to obtain the desired result on the supported surface of the cheese, the other surface being printed by turning. The relief thus obtained is then set during brining, the characteristic feature of the latter being to harden the surface of the cheese.

Advantageously, the mesh is impregnated with a coating formed by a layer of anti-corrosion thermosetting resin binding between them the warp threads and weft threads. The impregnation has other advantages: elimination of the warp and weft, improvement of the sliding of the cheese during transfers and protection of the polyester threads from degradation due to the action of basic washing products and to hydrolysis. The sealed surface 63 formed by the impregnation yields these advantages.

Advantageously, the anti-corrosion thermosetting resin used is of the vinyl ester type. Other resins such as phenolic, polyester or epoxy resins, or else elastomers of the edible polyurethane or silicone type may be used.

The same type of resin is used in the various embodiments which follow.

In another embodiment intended for maturing and storage, the spacing of the warp threads 3 and the weft threads 4 is greater. This is made possible by hardening of the surface of the cheese during brining, as mentioned above, which prevents the overprinting of an undesirable relief. The lower warp and weft density has the result of increasing the aeration of the lower surface of the cheese and reducing the cost of the mesh.

The mesh according to the present invention may be constructed from identical warp threads 3 and weft threads 4 in roving preferably having a width of 3 mm and a thickness of 0.4 mm. Their equal edge-to-edge spacing determines the 5-mm-square apertures 5.

The impregnation with several layers of anti-corrosion resin makes it possible to increase the amplitude of the relief of the mesh and consequently to provide additional spaces 6 for the passage of air between the cheese 7 and the mesh 1. The proportion of the surface of the cheese in contact with the mesh is thus reduced to approximately 30%, that is approximately 70% in contact with ambient air.

Figure 3:
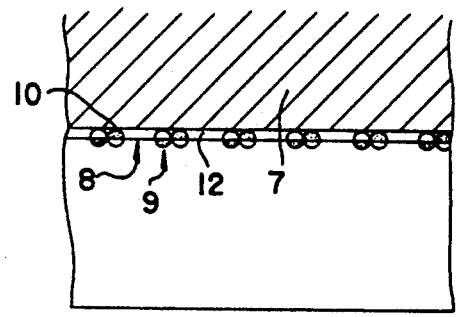
FIG. 3 shows a sectional view of a mesh.
Figure 4:
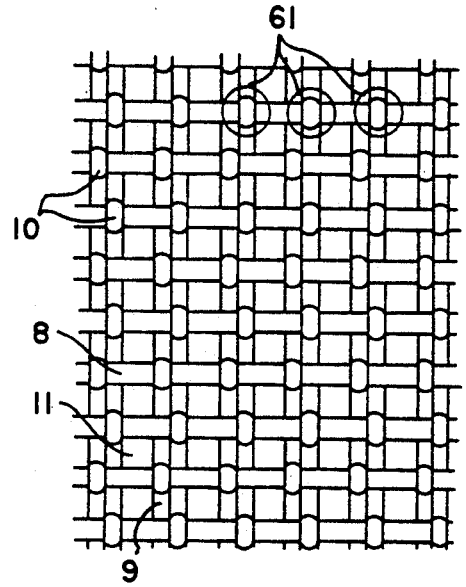
FIG. 4 shows a plan view of the mesh of FIG. 3.

In the embodiment illustrated in FIGS. 3 and 4, also intended for maturing and storage, the supported surface of the cheese is even further reduced and the resistance to deformation of the mesh is increased.

The weft threads or rovings 8 have, preferably, a width of 3 mm and a thickness of 0.4 mm and their edge-to-edge spacing is 5 mm. Preferably, the warp threads 9 have a width of 1.5 mm and a thickness of 0.4 mm. Two warp threads arranged side by side over a width of 3 mm interlace alternately with the weft threads thereby forming crossing zones 61.

A space of 5 mm is reserved between two groups of two warp rovings, which determines the 5 mm×5 mm apertures 11. The greater flexibility of the warp threads 9 makes it possible for them to be interlaced with the weft threads 8 without deforming the latter, which remain flat and taut, hence conferring on them a high resistance to the deformation caused by the weight of the cheese. After impregnation with four layers of thermosetting resin, the top and bottom surfaces of the mesh have lines of alternate projections 10 with rounded edges, having approximately a length of 5 mm and a width of 1.5 mm, formed by the juxtaposition of the warp threads 9 and weft threads 8 and expanded by the thickness of the resin. The cheese rests on these projections 10 and the aeration of its lower surface is provided by the apertures 11 produced by the spacing between warp threads 9 and weft threads 8 and by the channels 12 formed between the lines of projections 10 by the differences in level between the supported surface of the cheese 7 on the projections 10 and the upper part of the weft threads 8. Hence, approximately 90% of the lower surface of the cheese is ventilated, which prevents any formation of mold, reduces the number of turnings to one only and avoids any brushing during maturing. The low pressure exerted by the projections 10 on the cheese 7, of approximately 0.2 daN/cm² does not damage the latter. Furthermore, the rounded shape of the projections 10 allows the cheese 7 to slide without fats being extracted during transfers.

In the case of a fixed support for cheese as shown in FIG. 1, that is to say integral with a pallet or rack, the rigid reinforcement 2 is constructed from a circular ring 13 formed from hoop iron approximately 25 mm in width and 8 mm in thickness, rolled edgewise over an external diameter 14 of approximately 850 mm, welded and galvanized. This ring is bored with securing holes 15.

The highly taut mesh 1 is turned down on the external surface of the ring 13 and is sandwiched between the latter and an external belt 16 serving for the assembly and protection of the mesh 1 against shocks. This forms a connecting zone 62 between the mesh and the reinforcement.

The external belt 16 is preferably constructed from a section of polypropylene or polyethylene approximately 5 mm thick and 25 mm wide and the internal surface of which is cloth-lined in order to ensure a good bonding between the anti-adhesive plastic material and the fiber of the mesh, after impregnation with the resin.

The external belt 16 may also be made of galvanized steel, stainless steel or Duralumin. It may also be constructed of a first winding of a glass fiber tape woven according to a unidirectional weave, of high tensile strength and wound over a thickness of approximately 2 mm, and a second winding made of a highly shock-resistant polyester felt, wound over a thickness of approximately 3 mm.

The whole is made solid by impregnation with a anti-corrosion thermosetting resin as described above, it being possible to effect the impregnation by immersion coating or by any other known method. Overall impregnation of the mesh and of the reinforcement ensures the anti-corrosion behavior of the assembly.

In another embodiment, the reinforcement 2 could be of polygonal shape.

In the case of a movable support for cheese, the mesh, in order to be protected from shocks, must never come into contact with the supporting surface of the reinforcement, whatever side is supporting the cheese. This supporting surface may be a transfer or storage element: conveyor, clamping fork, pallet or rack. Furthermore, the cheese must be able to be extracted equally from either of the two surfaces of the mesh by sliding, which is precluded by the fixed support described above, its reinforcement 2, which protrudes on the reverse side, preventing this maneuver.

These two requirements result in the use of a reinforcement having an identical shape in relation to the two surfaces of the mesh, each of these surfaces being connected by a peripheral inclined panel at the edge of the reinforcement.

The latter is preferably circular in shape, but it may also be polygonal.

Figure 5:
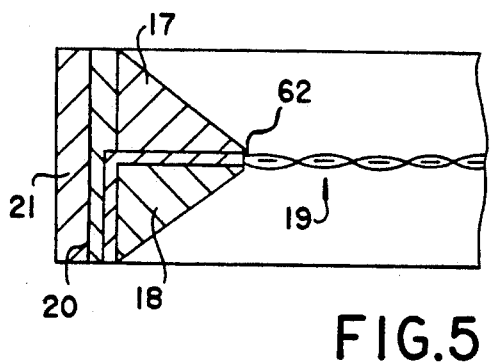
FIG. 5 shows a sectional view of a second support for cheeses.

According to the embodiment of FIG. 5, the reinforcement is constructed from two identical rings of galvanized, rolled and welded steel 17 and 18, the cross-section of which is a right-angled triangle having an external vertical side of approximately 15 mm and a horizontal side of approximately 20 mm. Said two rings are arranged symmetrically in relation to the mesh 19, their 20 mm sides bearing on the latter. The highly taut mesh 19 is turned down on the external side of the lower ring 18. A tape of glass fabric, of a height of approximately 32 mm, covering the external surface of the upper ring 17 and the turned-down part of the mesh 19 is wound over a thickness of approximately 3 mm. It is covered by a belt 21 made of polypropylene or polyethylene having a thickness of approximately 5 mm and lined with cloth on the inside or a winding of a tape of felt of polyester fiber, the whole being impregnated with an anti-corrosion resin, as described above.

Figure 6:
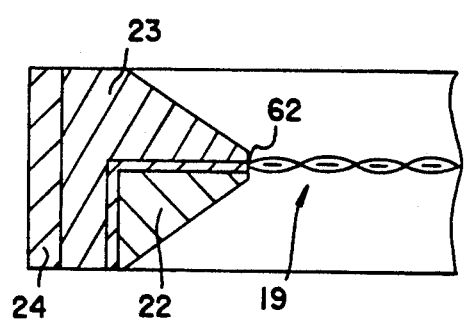
FIG. 6 shows a sectional view of a third support for cheeses.

According to another embodiment shown in FIG. 6, the reinforcement is constructed of a lower ring 22 of sectional, rolled, welded and galvanized steel, the cross-section of which has the shape of a right-angled triangle having a horizontal side of approximately 20 mm on which the mesh 19 rests and a vertical side of approximately 15 mm onto which the mesh 19 is turned down.

It also comprises an upper ring 23 of sectional, rolled, welded and galvanized steel having a triangular part symmetrical with the lower ring 22 contiguous to a rectangular part of a height of approximately 32 mm and of a width of approximately 10 mm, the top of which is in the same plane as the top of the triangular part. The external part is composed of a shock-resistant band 24 constructed of a belt of polyethylene or polypropylene, the internal surface of which is lined with cloth, of a thickness of approximately 5 mm or of a winding made of a felt of polyester fibers having a thickness of approximately 3 mm and impregnated with thermosetting resin.

The upper ring 23 is fitted over the ring 22, the taut mesh being sandwiched over 20 mm of the horizontal part and over 15 mm of the vertical part.

The assembly is then impregnated with an anti-corrosion thermosetting resin as described above.

According to a variant, the rings 17, 18, 21 and 22 are constructed of composite materials by filament winding using glass fiber or carbon, boron or aramid fiber and an anti-corrosion thermosetting resin. The rings 17, 18, 21 and 22 could also be constructed of stainless steel or Duralumin.

Figure 7:
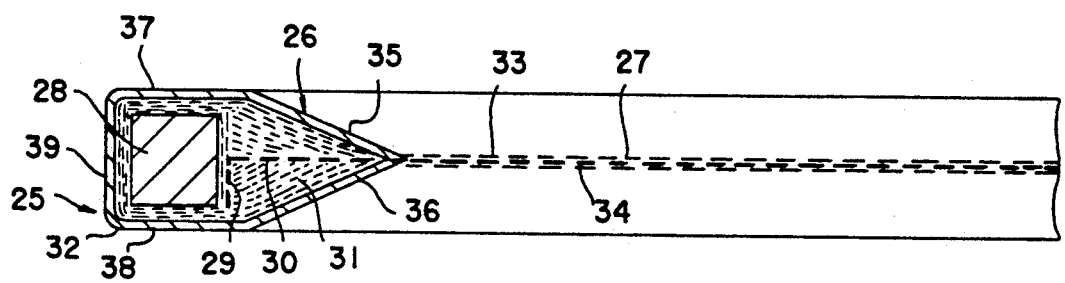
FIG. 7 shows a sectional view of a fourth support for cheeses.

With reference to FIG. 7, another embodiment of a support for cheeses identified generally by the reference 25 will now be described.

This support 25 is reversible and comprises an annular peripheral reinforcement, identified generally by the reference 26, which supports a central mesh 27. This mesh 27 may have any one of the structures described in relation to the preceding examples.

The peripheral reinforcement 26 comprises an annular core 28 of square cross-section which may be of any material and preferably of metal, and if appropriate hollow.

The peripheral edge 29 of the mesh 27 is turned down against the internal surface of the core 28, the mesh 27 extending in the median plane of said core.

The peripheral part 30 of the mesh 27 and the annular core 28 are surrounded by a mass 31 composed of glass fibers, if appropriate of rovings, impregnated with anti-corrosion synthetic resin.

Said mass 31 is completely surrounded by a felt of polyester fibers 32 also impregnated with resin, which forms an external casing for the shock- and friction-resistant peripheral reinforcement 25.

It can also be seen that, on either side of the mesh 27 and against the latter, there are provided filters 33 and 34 made of synthetic resin, the peripheral edges of which are, like the peripheral part 30 of the mesh 27, embedded in the mass 31.

In a production variant of the support 25 shown in FIG. 7, the annular core 28 is surrounded by a layer of fibers and is impregnated with thermosetting resin. The mesh 27 composed of warp and weft threads, and also impregnated and covered in thermosetting resin, is stretched. During the polymerization of the thermosetting resin, the turned down edge 29 of the mesh bonds to the fibers surrounding the core 28. The mass of fibers impregnated with resin 31 and its casing 32 are formed. The peripheral reinforcement 26 is arranged between two annular pieces of a mold and is clamped. After polymerization, the peripheral reinforcement 26 is removed from the mold. The support 25 is then produced and is such that it has no interstices at any point in its mesh 27 and its reinforcement 26.

As can be seen in the figure, in cross-section, the external shape of the reinforcement 26 is symmetrical in relation to the plane of the mesh 27 and has opposite surfaces 35 and 36 inclined towards the mesh 27 so as to form a V, parallel surfaces 37 and 38 extending outwards the branches 35 and 36 of said V and an external peripheral wall 39 joining said parallel surfaces 37 and 38. By virtue of said shapes, the support for cheeses 25 may be turned over in order to receive a cheese on the upper surface of the mesh 27 while, at the same time, allowing, from the two sides, the lateral removal of the cheese by sliding over the surface of the mesh 27 and the reinforcement 26, the cheese sliding without encountering any obstacles on the surfaces 35, 37 or 36, 38 of said reinforcement.

Figure 8:
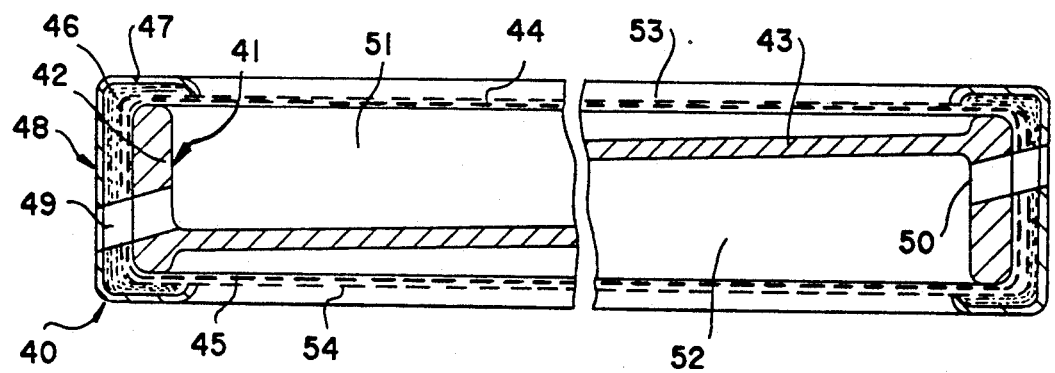
FIG. 8 shows a sectional view of a fifth support for cheeses.

With reference to FIG. 8, another embodiment of a support for cheeses identified generally by the reference 40, which is also reversible, will now be described.

This support 40 comprises a base structure, identified generally by the reference 41, which comprises a ring 42 of rectangular cross-section in the direction of its axis and a plate 43 inside said ring 42 and the peripheral edge of which is integral with said ring 42. The thickness of said plate 43 is much smaller than the axial dimension of the ring 42 and is inclined in relation to the axis of the latter.

Said base structure 42 is composed of fibers impregnated with resin, for example thermosetting resin, and is preferably produced by molding.

The support 40 also comprises two meshes 44 and 45 which cover the two opposite radial surfaces of the ring 42, the edges of which are turned down over the external surface of said ring 42.

The external surfaces of the ring 42 are covered by a mass 46 of fibers impregnated with, for example, thermosetting resin, said mass 46 being surrounded by an external casing 47 formed from a felt impregnated with resin, for example thermosetting resin.

Hence, the ring 42 of the base structure 41, the mass 46 and the casing 47 forms [sic] a peripheral reinforcement identified generally by the reference 48, which supports the opposite and parallel meshes 44 and 45.

Furthermore, there are provided in said peripheral reinforcement 48 transfer apertures 49 and 50 which open respectively into the spaces 51 and 52 separating the plate 43, which forms an internal partition respectively, and the meshes 44 and 45.

In order to produce the support 40, shown in FIG. 8, the following method may be used.

At first, the support structure 41 is produced. Having turned down the peripheral edges thereof against the external surface of the ring 42, the mesh 45 impregnated with thermosetting resin is stretched. When said mesh is polymerized and secured on the ring 42, the same method is applied to assemble the opposite mesh 44.

The mass 46 and its casing 47 are constructed. The peripheral reinforcement 48 thus constructed is arranged in a mold. When said mass 46 and the casing 47 are polymerized, the support 40 is removed from the mold which is then produced. Then the holes 49 and 50 are bored.

Of course, as in the previous example, filters 53 and 54, the peripheral edges of which are embedded in the mass 46, may be arranged on the external surfaces of the meshes 44 and 45.

When a cheese is arranged on the mesh 44 or the mesh 45, the liquid which runs away therefrom during its production is deflected by the internal partition 43 in order to be discharged through the apertures 49 or the apertures 50, at the periphery of the support 40, so as not to fall or drip onto the cheese which would be arranged on another support below the support 40.

Of course, the support 40 might have only one of the meshes 44 or 45 and have the same advantage.

Figure 9:
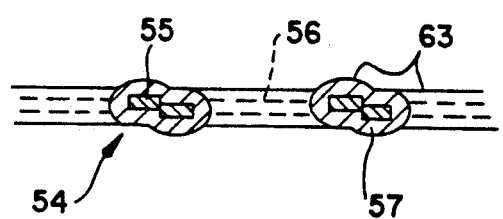
FIG. 9 shows an enlarged sectional view of a mesh.

With reference to FIG. 9, it can be seen that a mesh identified generally by the reference 54 has been shown in enlarged view and in cross-section, illustrating a structure suitable for forming the meshes used in the examples described above.

Said mesh 54 comprises weft threads 55 composed respectively of two fibers and warp threads 56.

As has been seen, the weft threads and the warp threads 55 and 56 are coated and impregnated with a resin chosen from the resins proposed above. Said resin constitutes a coating which eliminates the interstices and gives a rounded appearance to the openings of the mesh 54 and which provides said mesh with smooth external surfaces. Such a mesh 54 and one of the peripheral reinforcements described above, also covered with a resin forming a coating, makes it possible to obtain a support for cheese having no interstices and having smooth external surfaces.

I claim:

1. A support for manufacturing and storage of cheese, comprising:
   a mesh having a plurality of weft threads and a plurality of warp threads, with a first of said plurality of weft threads and a first of said plurality of warp threads being in a straight line and stretched perpendicular to each other, and a second of said plurality of warp threads being disposed and stretched directly adjacent to said first of said plurality of warp threads, wherein said first and second warp thread are interlaced alternately with respect to each other with at least said first of said plurality of weft threads, forming at least one crossing zone; and
   a coating of an anti-corrosion synthetic material which impregnates said threads of said mesh, forming an organic matrix, and forming a projection at each of said at least one crossing zones, said coating covering at least part of said reinforcement and providing a sealed surface.

2. Support for cheese according to claim 1, characterized in that the mesh is composed of flat weft and/or warp threads.

3. Support for cheeses according to claim 1, characterized in that the threads forming the mesh (1) are fibers of high mechanical strength, in particular glass, carbon, boron or aramid fibers or synthetic fibers of polyester or polyamide, or metal wires.

4. A support for manufacturing and storing of cheese, comprising:
   a mesh which is weared and stretched and which is secured on a peripheral, rigid reinforcement, said mesh having weft threads and warp threads which are interlaced, forming crossing zones, and
   a coating of an anti-corrosion synthetic material which coats threads of said mesh and said peripheral reinforcement forming an organic matrix connecting the weft threads and warp threads of said mesh and providing a sealed surface along the threads of said mesh, along the peripheral reinforcement, in the crossing zones of warp threads and weft threads of said mesh, and in a connecting zone of the threads of said mesh to said peripheral reinforcement.

5. Support for manufacturing and storage of cheeses according to claim 4, characterized in that the coating (57) is made of a thermosetting resin of the vinyl ester type.

6. Support for manufacturing and storage of cheeses according to claim 4, characterized in that the coating (57) is made of a thermoplastic resin of polypropylene.

7. Support for manufacturing and storage of cheeses according to claim 4, characterized in that the coating (57) is made of an elastomer of at least one of a group consisting of polyurethane and silicone.

8. Support for manufacturing and storage of cheeses according to claim 4, characterized in that the peripheral reinforcement (8) comprises an external casing (16) of a shock- and friction-resistant material.

9. Support for manufacturing and storage of cheeses according to claim 8, characterized in that the casing (16) is composed of a felt of polyester fibers, impregnated with the synthetic material forming the said coating.

10. Support for manufacturing and storage of cheeses according to claim 4, characterized in that the reinforcement (2) comprises a metal ring (28) and fibers impregnated with the said synthetic material which wind around the metal ring and in which the peripheral edge (27) of the mesh is embedded.

11. Support for manufacturing and storage of cheeses according to claim 4, characterized in that the external shape of the cross-section of the reinforcement (25) is symmetrical in relation to the plane of the mesh (27) and has opposite surfaces inclined towards the mesh so as to form a V, parallel surfaces extending outwards the branches of said V and a peripheral wall joining said two parallel surfaces.

12. Support for manufacturing and storage of cheeses according to claim 4, characterized in that the reinforcement (2) comprises a part which protrudes in relation to the mesh, in which part securing apertures (15) are provided.

13. Support for cheeses according to claim 4, characterized in that it comprises a plate supported by the peripheral reinforcement and located at a distance from the mesh, said plate being inclined and the peripheral reinforcement having at least one outlet aperture communicating with the space separating the plate and the mesh.

14. Support for cheeses according to claim 4, characterized in that it comprises two meshes (44, 45) secured on the said reinforcement, said meshes being arranged in parallel and at a distance from one another, and a separating partition (43), the peripheral edge of which is integral with the said reinforcement, said partition being inclined in relation to the meshes and the reinforcement having outlet apertures communicating with the two spaces separated by the said separating partition.

15. Support for manufacturing and storage of cheeses according to claim 4, characterized in that the mesh (33) is, at least on one side, covered with a filter (34), the edges of which are inserted in the said reinforcement.

16. Support for manufacturing and storage of cheeses according to claim 15, characterized in that the filter is made of polyolefin, in particular polypropylene.

* * * * *